United States Patent
Basnett et al.

(10) Patent No.: US 10,067,905 B2
(45) Date of Patent: Sep. 4, 2018

(54) DIGITAL INTERFACE FOR MANUFACTURING EQUIPMENT

(71) Applicant: Plasmability, LLC, Austin, TX (US)

(72) Inventors: Robert J. Basnett, Austin, TX (US); Stephen L. Cowell, Round Rock, TX (US)

(73) Assignee: Plasmability, LLC, Austin, TX (US)

( * ) Notice: Subject to any disclaimer, the term of this patent is extended or adjusted under 35 U.S.C. 154(b) by 437 days.

(21) Appl. No.: 14/721,893

(22) Filed: May 26, 2015

(65) Prior Publication Data
US 2016/0350256 A1    Dec. 1, 2016

(51) Int. Cl.
  *G06F 13/42* (2006.01)
  *G06F 13/40* (2006.01)
  *G06F 12/02* (2006.01)

(52) U.S. Cl.
  CPC ...... *G06F 13/4282* (2013.01); *G06F 12/0246* (2013.01); *G06F 13/4022* (2013.01); *G06F 13/4068* (2013.01); *G06F 2212/7208* (2013.01)

(58) Field of Classification Search
  CPC ............. G06F 13/4022; G06F 13/4068; G06F 13/4282; G06F 12/0246
  See application file for complete search history.

(56) References Cited

U.S. PATENT DOCUMENTS

| | | |
|---|---|---|
| 4,688,933 A | 8/1987 | Lapeyre |
| 5,566,345 A * | 10/1996 | Ostrowski ............. G06F 13/387 710/2 |
| 5,623,700 A * | 4/1997 | Parks .................. G06F 12/0835 710/53 |
| 5,790,811 A * | 8/1998 | Hewitt .................. G06F 13/364 710/105 |
| 5,877,752 A | 3/1999 | Puthuff et al. |

(Continued)

FOREIGN PATENT DOCUMENTS

WO    03-040882 A2    5/2003

OTHER PUBLICATIONS

Office Action for Taiwanese Patent Application No. 105116244, dated Jan. 25, 2017, 9 pages, Taiwanese Intellectual Property Office, Taiwan.

(Continued)

*Primary Examiner* — Nimesh G Patel
(74) *Attorney, Agent, or Firm* — Kurt Rauschenbach; Rauschenbach Patent Law Group, LLP

(57) ABSTRACT

A manufacturing equipment digital interface includes a shared Small Computer Standard Interface (SCSI) connector that is electrically connected to a manufacturing equipment SCSI bus. A plurality of SCSI-to-target-memory bridges is electrically connected to the shared SCSI connector. The plurality of SCSI-to-target-memory bridges interfaces the shared SCSI connector to a plurality of target memory devices. A drive controller includes a memory buffer that provides temporary storage of the information being transferred from the manufacturing equipment SCSI bus to the plurality of target memory devices. Also, the drive controller includes a SCSI-to-target-memory bridge arbitrator that controls the transfers of information from the manufacturing equipment SCSI bus to the target memory device. A network interface is electrically connected to the drive controller.

23 Claims, 1 Drawing Sheet

(56) References Cited

U.S. PATENT DOCUMENTS

| | | | | |
|---|---|---|---|---|
| 6,341,342 | B1* | 1/2002 | Thompson | G06F 3/0613 |
| | | | | 707/999.202 |
| 6,449,668 | B1* | 9/2002 | Hamai | G11B 20/10 |
| | | | | 348/E5.008 |
| 7,421,111 | B2 | 9/2008 | Dietz et al. | |
| 8,255,606 | B2 | 8/2012 | Schauer | |
| 2005/0099405 | A1 | 5/2005 | Dietz et al. | |
| 2005/0108452 | A1* | 5/2005 | Loffink | G06F 3/0607 |
| | | | | 710/74 |
| 2005/0261796 | A1 | 11/2005 | Shen | |
| 2005/0273649 | A1* | 12/2005 | Jung | G06F 13/124 |
| | | | | 714/5.11 |
| 2006/0064440 | A1 | 3/2006 | Perry | |
| 2006/0129767 | A1* | 6/2006 | Berenyi | G06F 13/1684 |
| | | | | 711/154 |
| 2006/0195212 | A1* | 8/2006 | Flach | G05B 19/41875 |
| | | | | 700/108 |
| 2006/0200690 | A1* | 9/2006 | Cline | G06F 12/0835 |
| | | | | 713/320 |
| 2008/0291179 | A1 | 11/2008 | Willemsem et al. | |
| 2010/0138583 | A1 | 6/2010 | Schauer | |
| 2011/0055239 | A1* | 3/2011 | Wolf | G06F 17/30516 |
| | | | | 707/759 |
| 2011/0185114 | A1* | 7/2011 | Bolanowski | G06F 12/0246 |
| | | | | 711/103 |
| 2014/0201562 | A1* | 7/2014 | Breakstone | G06F 1/30 |
| | | | | 713/600 |

OTHER PUBLICATIONS

"Notification of Transmittal of the International Search Report and the Written Opinion of the International Searching Authority, or the Declaration" for International Patent Application No. PCT/US2016/034088, dated Oct. 31, 2016, 17 pages, International Searching Authority, Korean Intellectual Property Office, Daejeon, Republic of Korea.

"Supplementary European Search Report" for European Patent Application No. 12823669.2, dated Jun. 23, 2015, 8 pages, European Patent Office, Munich, Germany.

www.Arrows Eng. Co., Ltd. [Semiconductor Items Plan, Production, Remodel, Repair, Sale Semiconductor Items Construction].

www.appliedmaterials.com.

http://www.lambda-electronic-de.

http://vdge.com.

"Notification of Transmittal of the International Search Report and the Written Opinion of the International Searching Authority, or the Declaration" for PCT/US2012/050458, dated Jan. 2, 2013, 10 pages, Korean Intellectual Property Office, Daejeon, Republic of Korea.

"Notification Concerning Transmittal of International Preliminary Report on Patentability (Chapter I of the Patent Cooperation Treatry)" for PCT/US2012/050458, dated Feb. 27, 2014, 7 pages, The International Bureau of WIPO, Geneva Switzerland.

"Notification Concerning Transmittal of International Preliminary Report on Patentability (Chapter I of the Patent Cooperation Treaty)", For International Application No. PCT/US2016/034088, dated Dec. 7, 2017, 13 pages, The International Bureau of WIPO, Geneva, Switzerland.

"Office Action" for Taiwanese Patent Application No. 105116244, dated Oct. 2, 2017, 9 pages, Intellectual Property Office of Taiwan, Taiwan.

"Notice of Allowance" for Taiwanese Patent Application No. 105116244, dated May 2, 2018, 2 pages, Taiwanese Patent Office, Taiwan.

* cited by examiner

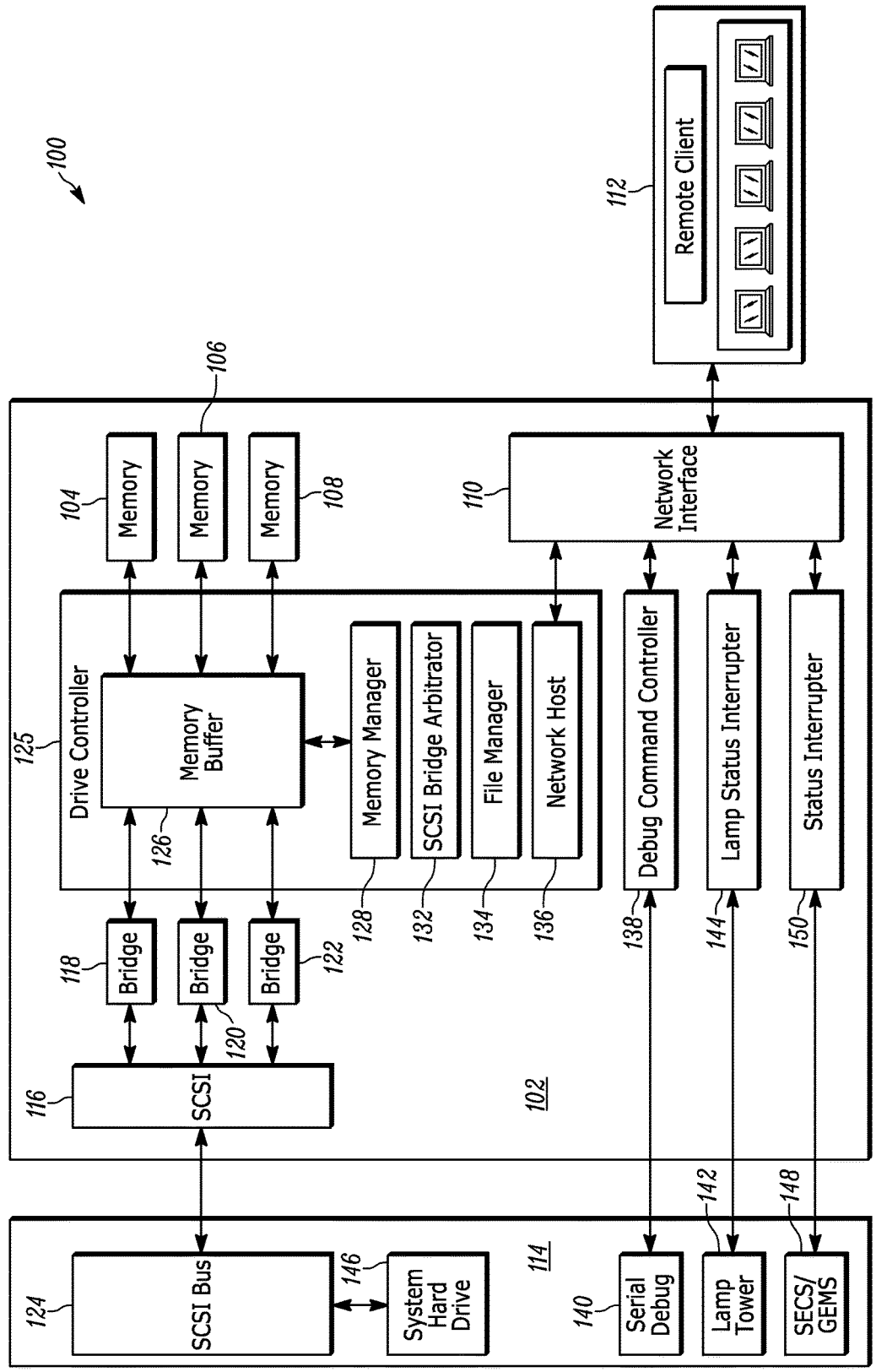

DIGITAL INTERFACE FOR MANUFACTURING EQUIPMENT

The section headings used herein are for organizational purposes only and should not to be construed as limiting the subject matter described in the present application in any way.

INTRODUCTION

Many legacy manufacturing systems, such as semiconductor manufacturing systems, manufactured before 2005 utilize floppy disk drives for general input and output of system and data files. In some systems, this floppy disk drive is connected via a Small Computer Standard Interface (SCSI) drive interface which is specially designed to allow a 1.44 MB floppy drive to bi-directionally communicate with a host computing system. Early systems manufactured by Applied Materials® utilize this type of SCSI system. These legacy systems include Applied Materials® models P5000®, ENDURA®, CENTURA® and PRODUCER® that process 200MM and smaller wafers. Many thousands of these systems are still in operation worldwide.

The host computer on these Applied Materials® (AMAT) legacy systems runs a proprietary operating system. The host computer includes a custom single board computer having a master SCSI bus controller that connects peripheral storage devices, including SCSI floppy disk drives and hard disk drives. In addition, the host computer connects to a removable 1.5 GB SyQuest® SyJet™ disk drive. Due to rapid advances in storage technology, the 1.44 MB SCSI floppy drive and the SyJet™ drive have become obsolete. Finding replacement SCSI floppy drives has become very difficult in recent years.

In addition, it is difficult to communicate with the host computer on these AMAT legacy systems because these computer systems have only minimal connectivity to computer networks that connect the manufacturing system to the factory computer. Consequently, there are limited ways to transfer system and data files.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The person skilled in the art will understand that the drawings, described below, are for illustration purposes only. The drawings are not necessarily to scale, emphasis instead generally being placed upon illustrating principles of the teaching. The drawings are not intended to limit the scope of the Applicants' teaching in any way.

FIGURE illustrates a block diagram of the digital interface for semiconductor manufacturing equipment according to the present teaching.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching may be performed in any order and/or simultaneously as long as the teaching remains operable. Furthermore, it should be understood that the apparatus and methods of the present teaching can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Many aspects of the digital interface for manufacturing systems are described in connection with semiconductor manufacturing systems. However, one skilled in the art will appreciate that the digital interface of the present teaching can be used with numerous types of manufacturing systems.

The Applied Materials Small Computer Standard Interface (AMAT SCSI) drive architecture cannot be readily modified to allow modern disk drives to be directly recognized by AMAT systems. The current solution provided by Applied Materials is to replace the main system computer and associated hardware, which costs approximately $200,000. This cost is prohibitive for most applications. Thus, there is a significant need for a much less expensive interface to allow modern disk drives to be directly recognized by AMAT systems.

Several manufacturers have produced SCSI-to-Secure Digital (SD), Compact Flash (CF) or Universal Serial Bus (USB) based products, which can be configured to be recognizable by AMAT systems. Some of these products are now commercially available. These products allow the newer data storage and transfer devices to replace obsolete floppy disk drive, older SCSI disk drives, and SyJet disk drives connected to a SCSI bus. However, the data storage for the replacement floppy disk is limited in size to 1.44 MB due to the need to emulate the 1.44 MB disk in order for the computer system to recognize it. For example, in these systems, a 2 GB USB thumb drive will still be recognized as 1.44 MB.

Some of the available replacement disk drives have at least some network capability that allows access to the files stored on the disk drive over a network connection, such as an Ethernet connection. Other available replacement disk drives have at least some network capability that allows access to the files stored on the disk drive through an interface, such as a serial interface, that has access to a network connection. The network connected devices typically do not have the capability of initiating commands on the SCSI bus, allowing transfer of files from one target peripheral device (HD, FD or RD) to another. However, even if this were possible, the host operating system may indicate errors or even crash due to the unexpected SCSI bus activity. This occurs because file system access on the Applied Materials SCSI bus is initiated by the Applied Materials host computer's master SCSI controller. File access is done automatically during system operation. Disruption to the data flow or file access during automatic operation may cause system errors or even cause the operating system to crash.

Traditionally, file transfer between the internal hard disk drive and the floppy disk drive has been initiated through the debug screen of the operating system using commands that are entered via the standard CRT light pen operator interface. Until now, the only means for read-only network access to the AMAT SCSI file system has been through a proprietary system developed by Plasmability, LLC, the assignee of the present application. The Plasmability, LLC system transfers files by making a connection to a debug port that operates with a 9600 baud serial connection using VT100 terminal emulation. By using a "type" command, with the associated file name, a file is read out in ASCII format over the serial connection and transmitted from the host system to the target computer. The target computer reads the file and, using a proprietary algorithm, reassembles the file back to its original state. A typical system file of 1.5 MB can take up to 20 minutes to download and process.

Performing the file transfer during system operation involves risk of crashing the system or corrupting the file transfer. To solve this problem, a connection is made to the system's status lamp tower. Lamp towers are universally used in semiconductor factories on equipment to indicate, at a glance, whether a processing system has an error, is processing material, is finished processing material, or is in an idle condition. Many other parameters can be configured for different system states, and can be identified through the lamp tower. Lamp towers typically offer four lamp colors and can be configured to display as flashing, steady, or off light indicator. By connecting the lamp status tower to a Plasmability remote light pen interface system, and configuring the interface to recognize safe states for file transfer by indication of the lamp tower status, file transfers can take place without worry of inducing unintended system crashes or file corruption. As an alternative to using the lamp tower as a status indicator, it is also possible, and sometimes preferable, to use the SECS/GEM communications bus to obtain similar information. The SECS/GEM communications bus uses a connectivity standard developed by Semiconductor Equipment Materials Initiative (SEMI).

Despite these innovations, there remains no currently available system for allowing bi-directional high-speed access of files using existing computers on legacy AMAT systems. Furthermore, due to the obsolescence of SCSI peripherals, including the 1.44 MB floppy drive, these legacy systems will need a way to transfer files to and from the AMAT system in the future. The need to fill the void created by the obsolescence of these SCSI peripherals is substantial, and it is presumed that nearly every owner of AMAT legacy systems can benefit from such technology.

In response to this substantial need, a disk drive interface for semiconductor manufacturing equipment system has been developed. Specifically, one embodiment of the digital interface of the present teaching, referred to as the Penulator Drive™ (PD™), provides a networked drive replacement for the floppy disk peripheral attached to AMAT and other legacy semiconductor manufacturing equipment. One feature of the Penulator Drive™ is that it allows modern secure-digital (SD) memory cards to be used for file storage and networked bi-directional file transfer to the legacy Applied Materials systems. One embodiment of the disk drive interface for semiconductor manufacturing equipment of the present teaching is that it uses a drive emulator that replaces and emulates the 1.44 MB SCSI floppy drive of an AMAT legacy system and adds the additional capability of a removable drive by emulating the 1.5 GB SyJet drive.

FIGURE illustrates a block diagram of the digital interface for semiconductor manufacturing equipment 100 according to the present teaching. The interface 100 includes a disk drive emulator 102 that utilizes various types of modern memory devices 104, 106, and 108, and an Ethernet network interface 110 that provides communication with a remote client 112. In some embodiments, the memory devices 104, 106, and 108 are secure-digital (SD) cards. The semiconductor manufacturing equipment interface system 100 allows bi-directional file transfer to and from a legacy semiconductor manufacturing equipment system 114.

The legacy semiconductor manufacturing equipment system 114 is connected to the disk drive emulator 102 through a shared SCSI connector 116. A plurality of SCSI-to-memory device bridges 118, 120, and 122 allow the SCSI bus 124 from the legacy semiconductor manufacturing equipment system 114 to communicate with target memory devices 104, 106, and 108 on the disk drive emulator 102. In some embodiments, the target memory devices 104, 106, and 108 are Secure Digital (SD) cards. The hardware used in the SCSI-to-memory device bridges 118, 120, 122 for many embodiments can be constructed from commercially available components. For many of these many embodiments, the source code in the SCSI-to-memory device bridges 118, 120, and 122 is available under an open source GNU software license.

Various target memory devices 104, 106, and 108 of the present teaching are configured for various drive and storage emulation functions. For example, the target memory device 104 can be an SD card, USB memory device, or compact flash memory device configured to replicate a 1.44 MB floppy disk. The target memory device 106 can also be an SD card, USB memory device, or compact flash memory device configured for 1.5 GB removable hard drive emulation. The target memory device 108 can also be an SD card, USB memory device, or compact flash memory device configured for a 4.0 GB hard drive emulation. A file manager 134 translates files that are transferred from the legacy semiconductor manufacturing equipment system 114 to a form that can be read by a standard computer such as a Windows PC.

One advantage of the current teaching is replacing floppy drives that use floppy storage disks constructed using thin magnetic materials as the storage medium, and are thus subject to mechanical and environmental damage, with more robust solid state memory technologies. In some embodiments, the floppy drive of a legacy semiconductor manufacturing equipment system 114 is replaced by a standard SD card memory device 104 formatted to 1.44 MB that is recognized by an AMAT systems as a floppy drive. The SD card memory device 104 formatted to 1.44 MB is fully solid state, which prevents files from being easily damaged by mechanical or environmental means. In some embodiments, the drive emulator 102 memory device 106 comprises a removable 1.5 GB SD card.

The digital interface for semiconductor manufacturing equipment 100 includes a controller 125 that includes a memory buffer 126 connected to both the SCSI-to-SD bridges 118, 120, and 122 and to the memory devices 104, 106, and 108. The memory buffer 126 provides temporary storage of the information being passed from the legacy semiconductor manufacturing equipment system 114 to the memory devices 104, 106, and 108. Consequently, the memory buffer 126 allows the SCSI bridges 118, 120, and 122 to be disconnected from the memory devices 104, 106, and 108 during various file transfers. The memory buffer 126 is controlled by a memory manager 128. The buffering of information prevents system crashes and/or file corruptions when various elements of the emulation system, such as the memory devices 104, 106, and 108 or the remote clients 112, are not actively connected to the legacy semiconductor manufacturing equipment system 114.

The drive emulator 102 of the present teaching is able to emulate multiple drive types using a single drive interface on the legacy semiconductor manufacturing equipment system 114. Many legacy semiconductor manufacturing equipment systems, including AMAT systems, do not have provisions for installing additional disk drives due to physical space constraints. An example drive interface from Applied Materials is the AMAT SCSI BUS, which typically has provisions for only 2 devices. The disk drive interface for semiconductor manufacturing equipment of the present teaching shares a single connection from the drive interface of the legacy system 114 using a multicast or redundant architecture to support multiple drive emulation types, such as floppy drives, removable hard disk drive, fixed hard disk drives.

In a multicast architecture, multiple disk drive emulation bridges 118, 120, and 122 are physically connected to one of the two SCSI connectors 116 that is connected to the drive interface of the legacy semiconductor manufacturing equipment system 114. A sharing communication protocol is used to share the connection amongst the multiple bridges 118, 120, and 122. In some embodiments, a SCSI bridge arbitrator 132 is used to implement the sharing communications protocol. The sharing communications protocol initiates file transfers from the appropriate drive emulation memory devices 104, 106, and 108 using the appropriate bridge 118, 120, and 122 to connect to the legacy semiconductor manufacturing system 114 at specific times that the SCSI bridge arbitrator 132 determines is proper.

Thus, the high-capacity SD card memory device 106 allows specific files, or the entire contents of a removable hard disk of a legacy semiconductor manufacturing equipment system 114 to be transferred to these modern removable memory devices and then easily removed from the system. If necessary, the file manager 134 is used to translate files from the legacy semiconductor manufacturing equipment system 114 to files that are compatible with modern operating systems and readable by a modern computer.

In one embodiment, the multicast architecture of the present teaching supports both floppy emulation and a SyJet™ 1.5 GB removable disk drive emulation in a single enclosure. In this embodiment, the memory device 104 is an SD card formatted for 1.44 MB floppy disk drive and uses SCSI-to-SD bridge 118. Memory device 106 is a SD card formatted for a SyJet™ 1.5 GB removable disk drive and uses SCSI-to-SD bridge 120. The connection to the legacy system 114 through the SCSI connector 116 for the bridges 118, 120 is shared, and the transfers of information to the memory devices 104, 106 are arbitrated by the SCSCI bridge arbitrator 132. This embodiment allows a single enclosure to emulate both a 1.44 MB floppy disk and a removable hard drive of the legacy system 114. This multicast architecture provides for replication according to the present teaching.

Some embodiments of the digital interface for semiconductor manufacturing equipment 100 of the present teaching include a network interface 110 that uses an Ethernet network protocol. The network interface 110 allows the legacy semiconductor manufacturing equipment system 114 to connect to remote clients 112 via standard Ethernet. The remote clients 112 may include various types of remote computer systems and processors including single terminals, multiple terminals, and cloud-based remote system. Hardware and software supporting various connection protocols resides in a network host 136. In various embodiments, the network host 136 supports Transmission Control Protocol (TCP) and the Internet Protocol (IP) and/or File Transfer Protocols (FTP) from remote network connections. The TCP/IP standard is the most widely used communications protocol that prepares and forwards data packets over a data network, such as an Ethernet network. File-transfer protocol is another standard network protocol commonly used to transfer computer files from one computer to another.

Thus, in some embodiments of the digital interface of the present teaching, the network host 136 supports a TCP/IP connection that allows the drive emulator 102 to be bi-directionally accessed by a remote client 112 over a standard TCP/IP connection. In other embodiments, the network host 136 supports file-transfer protocol that allows remote file sharing using FTP from an FTP-capable remote client 112. The memory buffer 126 and the memory manager 128 allow the SCSI bridges 118, 120, and 122 to be disconnected from the SD cards 104, 106, and 108 during file transfers to the remote client 112, preventing system crashes and/or file corruptions.

One feature of the disk drive interface for semiconductor manufacturing equipment of the present teaching is support for debugging features of the legacy semiconductor manufacturing equipment system 114. In one embodiment, an integrated debug command controller 138 connects a serial debugger 140 from the semiconductor manufacturing equipment legacy system 114 to the drive emulator 102. The debug command controller 138 may operate internal to the disk drive emulator 102 as shown in the FIGURE or can be external to the disk drive emulator 102. The debugger 140 may be connected to the remote client 112 through the network interface 110. In some embodiments, files are pushed from an AMAT legacy semiconductor manufacturing equipment system 114 using a secure serial connection to the AMAT system's serial debugger 140.

Another feature of the digital interface for semiconductor manufacturing equipment 100 of the present teaching is support for managing file transfer only during the system idle times of the legacy system 114. As described herein, lamp towers are commonly used in legacy semiconductor equipment to indicate the status of the equipment. For example, lamp towers connect to existing signal sources in legacy semiconductor manufacturing equipment and indicate when a production run begins and ends and also provide indication of alarm conditions. Idle conditions exist in the legacy system starting from the end of one process run and going until the beginning of a next run. Some embodiments of the digital interface of present teaching connect the disk drive emulator 102 to the lamp tower interface 142 of the legacy system 114 using a lamp status interrupter 144. The lamp status interrupter 144 may operate internal to the disk drive emulator 102, or the lamp status interrupter 144 may be connected to a remote client 112 through the network interface 110. The lamp status interrupter 144 gates the file transfer process.

The SEMI connectivity standard E30 (SECS/GEM) is a semiconductor's equipment interface protocol for equipment-to-host data communications. SECS is a layer six protocol that describes the content of the messages and GEM is a higher layer application protocol that defines the messages themselves. In an automated semiconductor fabrication facility, SECS/GEM communications can perform various tasks, such as starting and stopping equipment processing, collecting measurement data, changing variables, and selecting recipes for products. In legacy semiconductor equipment, SECS/GEMS communications are commonly used to indicate the status of the equipment. For example, SECS/GEMS connections are made to legacy semiconductor manufacturing equipment to indicate when a production run begins and ends and also to provide indication of many other system conditions. For example, SECS/GEMS connections are commonly used to indicate when idle conditions exist in the legacy system which start from the end of one process run and go until the beginning of a next run.

Some embodiments of the digital interface 100 of the present teaching connect the disk drive emulator 102 to a SECS/GEMS interface 148 of the legacy system 114 using a SECS/GEMS status interrupter 150. The SECS/GEMS status interrupter 150 may operate internal to the drive emulator 102, or the SECS/GEMS status interrupter 144 may be connected to a remote client 112 through the network interface 110 as shown in the FIGURE. The SECS/GEMS status interrupter 150 gates the file transfer process.

In order to ensure safe file transfer, the lamp status interrupter 144 or the SECS/GEMS interrupter 150 monitors for system idle conditions in the legacy system 114 and then triggers file transfers from the legacy system 114 during these system idle conditions. Files are pushed through the AMAT SCSI bus 132 to the SD card memory devices 104, 106, and 108 only during system idle conditions.

Another feature of the digital interface for semiconductor manufacturing equipment 100 is that it minimizes the required idle time of the legacy semiconductor manufacturing equipment. Specifically, the legacy semiconductor manufacturing equipment system 114 needs to be idle only long enough to transfer files across the SCSI bus from the legacy system disk drive 146 to one or more of the emulator drive memory devices 104, 106, and 108 or to the remote client 112. Once the file is moved off the legacy semiconductor manufacturing equipment system disk drive 146, the file can be downloaded to other external systems without impacting the operation of the legacy semiconductor manufacturing equipment system. For example, a typical file of 0.5 MB would take twenty minutes to transfer using the Plasmability, LLC product. The legacy semiconductor manufacturing equipment system would need to be in an idle state for this entire twenty minute duration to avoid any risk of system crashes and/or corruption. Because most semiconductor factories must operate continuously 24/7 with as little down time as possible, twenty minute idle times are highly undesirable.

In contrast, with the digital interface for semiconductor manufacturing equipment of the present teaching, the same 0.5 MB file can be transferred off of the system hard disk drive 146 of the legacy semiconductor manufacturing equipment 114 in about one second. The transfer time is limited only by the read/write times of the SD card memory devices 104, 106, and 108 and the SCSI bus 132 speed on the legacy system 114. Once the file is moved to the SD card memory devices 104, 106, 108, the legacy semiconductor manufacturing equipment system 114 can resume processing, and the subsequent file transfer of the system hard drive contents to the network can take place without impacting legacy semiconductor manufacturing equipment system operation. After the file has been moved to one or more of the SD card memory devices 104, 106, and 108, the file transfer speed is paced only by the Ethernet connection speed, which is typically 10/100/1000 MBPS depending upon the network cards and connection. In this way, file transfers to remote clients 112 that previously required very significant times, such as 20 minutes, are fully completed in a matter of a few seconds.

One feature of the digital interface for semiconductor manufacturing equipment of the present teaching is the use of high-speed bi-directional network access to and from the legacy semiconductor manufacturing equipment system 114. High-speed bi-directional network access allows real-time operations to be performed. It is highly desirable for system operators to download files associated with processed wafers and wafer lots in real-time. The lamp status interrupter 144 and the SECS/GEMS interrupter 150 allows the history files including lamp tower status of a lot of processed wafers to be downloaded immediately and automatically upon completion of the processing. This is in contrast to prior art systems where files require manual download using the floppy drive.

In addition, the high-speed bi-directional network access in the digital interface for semiconductor manufacturing equipment of the present teaching allows transfer of semiconductor processing recipes and system parameters between legacy semiconductor manufacturing equipment 114 and system operators and/or various types of automated semiconductor equipment control systems. In some embodiments of the interface, the bi-directional transfer of processing recipes and system parameters occurs in real time.

One aspect of the present teaching is that methods for interfacing to legacy semiconductor manufacturing equipment systems take much less time than prior art methods of interfacing to legacy semiconductor manufacturing equipment systems. Another aspect is that the methods of the present teaching is that the methods are more automated and do not rely on the user typing in command line interface commands as are frequently required in prior art methods. A further aspect of the methods of the present teaching is that the interface supports bidirectional file transfer where files can be transferred from the semiconductor manufacturing equipment to the drive emulator or remote client, and files can also be transferred to the semiconductor manufacturing equipment from the drive emulator or remote client.

In one method according to the present teaching, information is transferred from the legacy system 114 to the drive emulator 102 and additionally to the remote client 112. The first step of this method is to establish a secure connection from a remote client 112 to the drive controller 125 and to indicate the desired information transfer action, which in this case the transfer action is to retrieve a file from the legacy system 114.

The second step is to determine the status of the legacy system 114 using the lamp tower 142 status or other communications bus that indicates system status. Upon determination that it is safe to make a transfer of information, a connection is initiated from the drive controller 125 through the shared SCSI connector 116 to the manufacturing equipment SCSI bus 124 in step three of the method. In step four of the method, a "copy" command for a particular file is sent to the legacy system 114 from the drive controller 125, and the particular file is sent to the memory buffer 126. In some embodiments, this file transfer occurs in less than one second. If the lamp tower 142 indicates the legacy system 114 has started to run, the lamp status interrupter 144 will send a signal for the file transfer to abort. In some methods according to the present teaching, the lamp tower 142 status indication of the legacy system status is replaced with a SECS/GEM 148 communication indicator of legacy system status. In some methods according to the present teaching, a further step five is used to send the file via a secure connection over the network interface 110 to the remote client 112. This transfer process can also take less than one second.

In addition to transferring files from the legacy system 114 to the emulator drive 102 or remote client 112, the methods of the present teaching can also transfer files to the legacy system 114. In methods that include transferring files to the legacy system 114, the first step is to establishing a secure connection from a remote client 112 to the drive controller 125 and to indicate the desired action, which in this case to send a file to the legacy system 114. The second step is to determine the status of the legacy system 114 using the lamp tower 142 status or other communications bus that indicates system status. Upon determination that it is safe to make a transfer of information based on the status of the legacy system 114, a connection is initiated from the drive controller 125 through the shared SCSI connector 116 to the manufacturing equipment SCSI bus 124 in step three of the method. In step four, a "copy" command for a particular file is sent to the legacy system 114 from the drive controller 125, and the particular file is sent from the memory buffer 126 to the legacy system hard drive 146. In some methods, this file transfer also occurs in less than one second. If the lamp tower 142 indicates that the legacy system 114 has started to run, the lamp status interrupter 144 will send a signal for the file transfer to abort. In some embodiments, the lamp tower 142 status indication is replaced with a SECS/GEM 148 communication indicator of legacy system status and the method is modified accordingly.

Some methods for transferring files to and from the legacy system according to the present teaching are managed using a software program that runs on the Microsoft Windows® operating system. The files are transferred back and forth between the drive emulator 102 and the remote client 112 in a way that appears to the user as a standard FTP transfer system. In some embodiments, a file backup system is integrated into the management software program that provides automatic back up of the connected systems and allows the user to select the lamp tower conditions that allow for safe file transfer.

One aspect of the high-speed bi-directional network access in the disk drive interface for semiconductor manufacturing equipment of the present teaching is that the transfer of information off of the legacy semiconductor manufacturing system 114 reduces the amount of information that needs to remain in the memory that is internal to the legacy semiconductor manufacturing system. This reduces the burden on the legacy semiconductor manufacturing system's memory capacity. For example, many Applied Materials semiconductor manufacturing equipment systems accumulate large numbers of process recipe and parameter files on the system hard disk drive. This accumulation of large amounts of information on the legacy semiconductor manufacturing system memory can impact the system's operation and cause a system crash and/or file corruption. Thus, another aspect of the high-speed bi-directional network access in the disk drive interface for semiconductor manufacturing equipment of the present teaching is that recipes and/or system parameter files can be kept on the removable disk drive section of the drive emulator 102 and moved to the legacy system's hard disk drive 146 only as needed, which frees limited memory space for other system functions.

Another feature of the semiconductor manufacturing equipment interface system 100 of the present teaching is that the legacy system hard drive 146 can be periodically reformatted to improving the performance and operation of the hard disk drive 146. The semiconductor manufacturing equipment interface system 100 of the present teaching allows all of the data to be moved off of the legacy system hard disk drive 146 and transferred to external storage in the SD card memory device 108 formatted for 4.0 GB storage, and/or transferred remotely via FTP to a client 112 machine. Once the hard drive information is moved off the legacy system hard disk drive 146, the hard disk drive 146 can be reformatted and the information can then be easily transferred back to the hard disk drive 146.

Another feature of the semiconductor manufacturing equipment interface system 100 of the present teaching is that it supports mirroring of the legacy system hard disk drive. Mirroring is a replicating of the contents of one disk drive onto one or more separate disk drives that can be done in real time. In one method according to the present teaching, the legacy system hard drive may be mirrored onto the drive emulator 102 or onto a remote client 112. In some methods of the present teaching, the legacy system hard drive is mirrored onto the SD card memory device 108 that emulates the hard drive. The legacy semiconductor manufacturing system operations are then controlled in real time using the information stored on the hard disk drive emulator. Methods of operating the legacy semiconductor manufacturing system include uploading semiconductor process recipes and parameters for runs and offloading run-time and other process information collected by the legacy semiconductor manufacturing system during the process run.

The semiconductor manufacturing equipment digital interface system 100 of the present teaching provides network access for AMAT legacy systems using commercially available components, such as a SCSI-to-SD bridge, and the exiting lamp tower and/or SECS/GEMS interfaces on the semiconductor manufacturing system that access signals and serial commands being sent to the AMAT legacy system's debug port. Thus, the combination of features of the semiconductor manufacturing equipment interface system of the present teaching allows legacy AMAT systems to have network access without expensive system electronics retrofits. The network access allows automated, bi-directional, high-speed file transfers during periods of system operation, such as system idle times, that are known as safe for such activity.

In known semiconductor manufacturing systems, general file transfer to AMAT systems is only possible with manual file transfers being initiated by entering commands via a light pen on the CRT operating screen, or by directly connecting a computer to the semiconductor equipment system's debug port. In these known semiconductor manufacturing systems, file input and file output is limited to a maximum cumulative file size of 1.44 MB. With the semiconductor manufacturing equipment interface system 100 of the present teaching, automated system back up's and file transfers can now take place at high speed. There is a significant need to implement such high-speed back up's and file transfers on AMAT legacy semiconductor equipment systems.

Another feature of the semiconductor manufacturing equipment digital interface system 100 of the present teaching is that it allows status information that is received or calculated to be broadcast via text message, email, or other web enabled method. For example, system status changes such as faults, warnings lot complete, or changes to operating parameters, can be programmatically monitored and messages can be sent to operators, engineers or managers via these web enabled methods as to the state of the connected system.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A semiconductor manufacturing equipment digital interface comprising:
   a) a shared Small Computer Standard Interface (SCSI) connector that is electrically connected to a semiconductor manufacturing equipment SCSI bus;
   b) a status interrupter electrically connected to an output of the semiconductor manufacturing equipment, the status interrupter configured to determine an idle condition in the semiconductor manufacturing equipment;
   c) a plurality of SCSI-to-target-memory bridges that are electrically connected to the shared SCSI connector and that interface the shared SCSI connector to a plurality of target memory devices;
   d) a disk drive controller electrically connected to an output of the status interrupter, the disk drive controller comprising a memory buffer that provides temporary storage of the information being transferred from the manufacturing equipment SCSI bus to the plurality of target memory devices and a SCSI-to-target-memory bridge arbitrator that controls the transfers of information from the manufacturing equipment SCSI bus to the target memory device based on the determination of the idle condition by the status interrupter; and
   e) a network interface that is electrically connected to the drive controller.

2. The semiconductor manufacturing equipment digital interface of claim 1 wherein the semiconductor manufacturing equipment comprises legacy semiconductor manufacturing equipment.

3. The semiconductor manufacturing equipment digital interface of claim 1 wherein at least one of the plurality of SCSI-to-target-memory bridges comprises a SCSI-to-hard disk drive bridge.

4. The semiconductor manufacturing equipment digital interface of claim 1 wherein at least one of the plurality of SCSI-to-target-memory bridges comprises a SCSI-to-removable hard disk drive bridge.

5. The semiconductor manufacturing equipment digital interface of claim 1 wherein at least one of the plurality of SCSI-to-target-memory bridges comprises a removable SyJet™ 1.5 GB disk drive bridge.

6. The semiconductor manufacturing equipment digital interface of claim 1 wherein at least one of the plurality of SCSI-to-target-memory bridges comprises a floppy disk drive bridge.

7. The semiconductor manufacturing equipment digital interface of claim 1 wherein at least one of the target memory devices comprises a Secure Digital (SD) card.

8. The semiconductor manufacturing equipment digital interface of claim 1 wherein at least one of the target memory devices comprises a USB memory device.

9. The semiconductor manufacturing equipment digital interface of claim 1 wherein at least one of the target memory devices comprises a compact flash memory device.

10. The semiconductor manufacturing equipment digital interface of claim 9 wherein the compact flash memory device is formatted for a 1.44 MB floppy disk drive.

11. The semiconductor manufacturing equipment digital interface of claim 9 wherein the compact flash memory device is formatted for a SyJet™ 1.5 GB removable disk drive.

12. The semiconductor manufacturing equipment digital interface of claim 1 further comprising a serial port.

13. The semiconductor manufacturing equipment digital interface of claim 1 further comprising a debug command controller that is electrically connected to the drive controller.

14. The semiconductor manufacturing equipment digital interface of claim 1 wherein the status interrupter is electrically connected to a lamp status tower of the semiconductor manufacturing equipment.

15. The semiconductor manufacturing equipment digital interface of claim 1 wherein the status interrupter comprises a SECS/GEMS interface.

16. The semiconductor manufacturing equipment digital interface of claim 1 wherein the memory buffer provides temporary storage of the information being passed from the semiconductor manufacturing equipment to at least one of the plurality of target memory devices, thereby allowing a corresponding one of the plurality of SCSI-to-target-memory bridges to be disconnected from an associated target memory device during file transfers.

17. The semiconductor manufacturing equipment digital interface of claim 1 further comprising a remote client computer electrically connected to the network interface.

18. The semiconductor manufacturing equipment digital interface of claim 1 wherein the network interface comprises a network host that supports a TCP/IP connection protocol that allows bi-directional access by a remote client over a standard TCP/IP connection.

19. The semiconductor manufacturing equipment digital interface of claim 1 wherein the network interface comprises a network host that supports a file transfer connection protocol (FTP) that allows bi-directional access by a remote client over a FTP connection.

20. A computer system for semiconductor manufacturing equipment, the computer system comprising:
   a) a semiconductor manufacturing equipment Small Computer Standard Interface (SCSI) bus;
   b) a SCSI system hard drive that is electrically connected to the semiconductor manufacturing equipment SCSI bus;
   c) a shared SCSI connector that is electrically connected to the semiconductor manufacturing equipment SCSI bus;
   d) a status interrupter electrically connected to an output of the semiconductor manufacturing equipment, the status interrupter configured to determine an idle condition in the semiconductor manufacturing equipment;
   e) a plurality of SCSI-to-target-memory bridges that are electrically connected to the shared SCSI connector and that interface the shared SCSI connector to a plurality of target memory devices;
   f) a drive controller electrically connected to an output of the status interrupter, the disk drive controller comprising a memory buffer that provides temporary storage of the information being transferred from the manufacturing equipment SCSI bus to the plurality of target memory devices and a SCSI-to-target-memory bridge arbitrator that controls the transfers of information from the manufacturing equipment SCSI bus to the target memory device based on the determination of the idle condition by the status interrupter;

g) a debug command controller that is electrically connected to the drive controller;

h) a lamp tower that is electrically connected to the drive controller;

i) a network interface that is electrically connected to the drive controller; and j) a host computer that is electrically connected to the network interface.

21. The computer system of claim 20 wherein the debug command controller comprises a serial debug command controller.

22. The computer system of claim 20 further comprising a file manager that translates files transferred from a legacy semiconductor manufacturing equipment system to a form that can be read by a client computer connected to the network interface.

23. The computer system of claim 20 further comprising a memory manager that controls the memory buffer.

* * * * *